(12) United States Patent
Fairhurst et al.

(10) Patent No.: US 8,764,605 B2
(45) Date of Patent: Jul. 1, 2014

(54) VARIATOR

(75) Inventors: Paul Fairhurst, Horwich (GB); Robert A. Oliver, Preston (GB)

(73) Assignee: Torotrak (Development) Limited, Lancashire (GB)

( * ) Notice: Subject to any disclaimer, the term of this patent is extended or adjusted under 35 U.S.C. 154(b) by 403 days.

(21) Appl. No.: 12/808,147

(22) PCT Filed: Dec. 5, 2008

(86) PCT No.: PCT/US2008/085679
§ 371 (c)(1),
(2), (4) Date: Sep. 17, 2010

(87) PCT Pub. No.: WO2009/076204
PCT Pub. Date: Jun. 18, 2009

(65) Prior Publication Data
US 2011/0028267 A1 Feb. 3, 2011

(30) Foreign Application Priority Data
Dec. 6, 2007 (GB) .................................. 0723857.9

(51) Int. Cl.
*F16H 15/38* (2006.01)
(52) U.S. Cl.
USPC ................................ 476/42; 476/46; 267/161

(58) Field of Classification Search
USPC ................ 476/40, 42, 45, 46, 47, 70; 74/470, 74/473.29, 490, 490.14, 519, 522, 522.5, 74/523, 524; 267/161
See application file for complete search history.

(56) References Cited

U.S. PATENT DOCUMENTS

| 3,455,177 A | 7/1969 | Schofield ........................... 476/8 |
| 4,018,104 A * | 4/1977 | Bland et al. ....................... 74/531 |
| 4,257,495 A | 3/1981 | De Brie Perry ............. 188/322.5 |

(Continued)

FOREIGN PATENT DOCUMENTS

| EP | 0 120 636 | 3/1984 |
| GB | 344063 | 3/1931 |
| GB | 1026734 | 4/1966 |

(Continued)

OTHER PUBLICATIONS

International Preliminary Report on Patentability dated Aug. 6, 2010 issued in PCT/US08/85679.

(Continued)

*Primary Examiner* — David M Fenstermacher
(74) *Attorney, Agent, or Firm* — Fulbright & Jaworski LLP

(57) ABSTRACT

Variators that include a damped roller control part.

12 Claims, 5 Drawing Sheets

(56) References Cited

U.S. PATENT DOCUMENTS

| | | | |
|---|---|---|---|
| 4,434,676 A | 3/1984 | Horton | 476/43 |
| 5,111,710 A | 5/1992 | Perry | 476/40 |
| 6,077,185 A | 6/2000 | Kobayashi | 476/10 |
| 6,106,431 A * | 8/2000 | Oshidari | 476/40 |
| 6,117,043 A | 9/2000 | Imanishi et al. | 476/46 |
| 6,251,038 B1 | 6/2001 | Ishikawa et al. | 475/216 |
| 6,261,203 B1 * | 7/2001 | Shimizuya et al. | 476/40 |
| 6,402,657 B1 * | 6/2002 | Sich | 476/42 |
| 6,461,270 B2 * | 10/2002 | Oshidari | 476/42 |
| 6,780,139 B2 | 8/2004 | Misada et al. | 476/73 |
| 7,086,981 B2 | 8/2006 | Ali et al. | 475/210 |
| 7,563,192 B2 * | 7/2009 | Imanishi et al. | 476/8 |
| 2002/0142882 A1 * | 10/2002 | Sugihara | 476/40 |
| 2005/0148426 A1 * | 7/2005 | Henzler | 476/10 |
| 2008/0269001 A1 * | 10/2008 | Greenwood et al. | 475/216 |
| 2011/0300989 A1 * | 12/2011 | Greenwood et al. | 476/46 |

FOREIGN PATENT DOCUMENTS

| | | |
|---|---|---|
| GB | 1133265 | 11/1968 |
| GB | 2423122 A * | 8/2006 |
| JP | 2003/269559 | 9/2003 |
| RU | 721624 | 3/1980 |
| WO | WO 2006/084905 | 8/2006 |

OTHER PUBLICATIONS

Extended European Search Report in Application No. 08860475.6 dated Feb. 4, 2011.

Japanese Notice of Reasons for Rejection in Japanese Patent Application No. 2010-537109 dated May 27, 2013.

Office Communication in Canadian Patent Application No. 2,671,895 mailed Dec. 16, 2013.

* cited by examiner

VARIATOR

CROSS REFERENCES TO RELATED APPLICATIONS

This application is a national phase application under 35 U.S.C. §371 of International Application No. PCT/US2008/085679 filed on Dec. 5, 2008, which claims priority to Great Britain Application No. 0723857.9 filed Dec. 6, 2007, both of which are incorporated by reference without disclaimer.

The present invention relates to variators—that is, to devices for transmitting drive at a continuously variable speed ratio between a rotary input and a rotary output—and more specifically to variators in which drive is transmitted from one race to another by a set of rollers which run upon suitably shaped faces of the races and are movable to alter the speed ratio.

Many published patent applications in the name of Torotrak (Development) Limited concern such a variator in which at least one pair of races is mounted for rotation about a common axis (referred to below as the variator axis) and has facing, generally semi-toroidally recessed surfaces which together define a generally toroidal cavity. The rollers are mounted in the cavity and run upon the races' recessed surfaces to transfer drive from one to the other. The rollers' mountings permit them not only to spin about their own axes, but also to undergo a tilting motion, changing the angle formed between the roller axis and the variator axis. Such tilting motion—executed by the rollers in unison—is associated with a change in the relative speeds of the races, and hence in the speed ratio provided by the variator. This type of device is often referred to as a toroidal-race, rolling-traction variator.

Numerous mechanisms have been proposed over the years for controlling the tilting motion of the rollers, but particular reference is directed in this regard to published international patent application WO2006/084906 (application number PCT/EP2006/050860, Torotrak (Development) Ltd et al) which concerns a simple mechanism for the purpose. A drawing from that application is reproduced herein as FIG. 1. Reference numerals have been altered.

This variator 10 has two rollers 12a, 12b mounted in a cavity defined between a pair of the aforementioned semi-toroidally recessed races, the periphery of one of which is seen at 14. The other race is omitted as it would otherwise conceal the rollers. Each roller is mounted for rotation about its own axis between forks 16 of a respective carrier 18a, 18b. The carriers are each coupled through a respective ball joint 20a, 20b to a lever 22. A pin 24, which is immovably secured to the variator's housing (not shown) forms a fulcrum for the lever, being received in a slot 26 of it. The lever has a cross bar 28 extending to either side of the fulcrum, and the ball joints 20a, 20b are coupled to the cross bar on opposite sides of the fulcrum. A radial arm 30 of the lever is used to control its turning motion, and so to control the variator speed ratio. For example this lever may be coupled to a push bar leading to a driver control. It could alternatively be actuated through a powered mechanism, e.g. a hydraulic actuator.

Because the rollers 12 are constrained between the races 14, their centres follow a circular path 31 about the races' common axis, (the variator axis) which is indicated by a cross 34 in the drawing. It will be apparent from the drawing that turning the lever causes the rollers to move in the same circumferential direction about this axis (both clockwise or both anti-clockwise). This displacement of the rollers causes them to steer themselves in unison to new tilt angles (that is, the tilt angles of both rollers change by substantially equal amounts) and so produces a change of speed ratio. The ball joints 20a, 20b provide them with the necessary freedom of movement.

The variator 10 uses a single mechanism—the lever 22—to actuate both rollers. It is known that variators of this type suffer from potential problems due to unequal load sharing between the rollers. If the rollers adopt tilt angles which are even fractionally mismatched then one will tend to provide a different speed ratio from the other. The speed mismatch must be accommodated through slip at the roller/race interface, but the result is that load is unequally distributed between the rollers leading to highly deleterious effects including poor performance and excessive wear. The mismatch potentially occurs through manufacturing tolerances etc. To avoid such problems, roller control mechanisms using a single actuator often provide the rollers with some additional freedom of movement enabling them to find positions in which load is equally shared. In the FIG. 1 example, this is achieved by means of the slot 26, which enables the lever 22 to move along a direction which is radial to the variator axis 34. Radial movement (specifically, radial translation) of the lever causes the rollers to move circumferentially along their circular paths 31, but note that whereas lever rotation causes the rollers to move in the same circumferential direction, lever translation causes them to move in opposite direction (i.e. one clockwise and the other anti-clockwise). Hence lever translation changes the tilt angle of one roller relative to that of the other. Any mismatch of load between the rollers causes a net force on the lever tending to displace it, and the resultant displacement (translation) tends to equalise the roller load. The lever naturally seeks a radial position in which roller load is equally shared.

The mechanism of FIG. 1 has been found to suffer from unwanted vibration, and it is to this problem that the present invention is addressed.

SUMMARY

In accordance with the present invention there is a variator comprising first and second races mounted for rotation about a variator axis and having facing semi-toroidally recessed surfaces, first and second rollers disposed between the races to run upon their recessed surfaces and so transfer drive from one race to the other at a continuously variable speed ratio, each roller being rotatably mounted upon a respective carrier and being free to undergo a tilting motion to change a tilt angle between its axis and the variator axis, and a roller control part provided with mountings which permit it to undergo both (a) rotation about a fulcrum and (b) translation, the carriers being coupled to the control part on opposite sides of the fulcrum so that rotation of the control part causes the rollers both to move in the same circumferential direction about the variator axis and consequently to steer themselves in unison to new tilt angles thereby providing a change in the speed ratio, and translation of the control part causes the tilt angle of one roller to vary relative to that of the other and so enables the rollers to adopt positions in which load upon them is balanced, the variator being characterised by provision of a damper which damps translation of the control part.

Here and below "translation" is used to refer to movement resulting in a change of an object's location, and to distinguish such movement from "rotation". "Movement" is used to refer to motion involving translation or rotation or both. The terms are of course commonly used in these senses in geometry.

The damper may damp only translation of the control part, or it may damp both translation and rotation of the control part.

Preferably the damper is frictional. It may for example incorporate a spring to bias together two surfaces, friction between which resists translation of the control part. Other forms of damper could however be used. For example the damper could be hydraulic.

It is particularly preferred that the control part is a lever mounted through a fulcrum about which it is able to rotate. The lever need only be free to rotate through a small angular range, and the term "rotation" is to be understood in this sense. The fulcrum itself may be movable to permit translation of the lever. The damper preferably acts upon the fulcrum to damp translation of it. In this way damping can be provided only of the rotational movement of the control part and not of its translation. Alternatively the damper may act between a fixed part and the control part itself, in order to damp both rotation and translation thereof.

Preferably the control part's mountings permit it only one degree of freedom of translational movement. Still more preferably the control part is able to move only along a direction substantially radial to the variator axis.

The mountings of the control part preferably comprise a slot defining the direction along which the control part is able to translate, and a follower riding in the slot.

Specific embodiments of the present invention will now be described by way of example only with reference to the accompanying drawings in which:

DETAILED DESCRIPTION

Figure 2A:
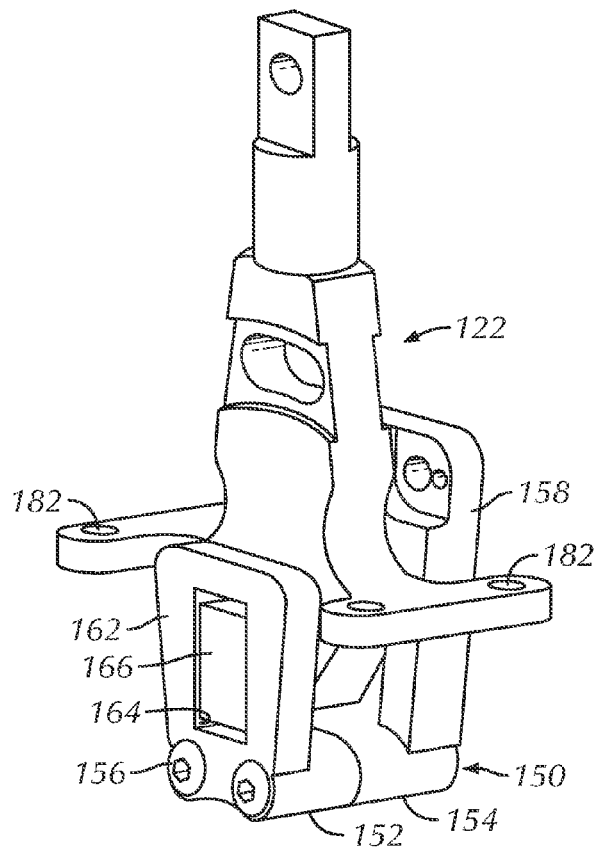
FIGS. 2a and 2b are both perspective views of a lever mechanism according to the present invention, differing in that in FIG. 2b a bracket has been cut away to reveal components housed within it, which are seen partly in section.
Figure 2B:
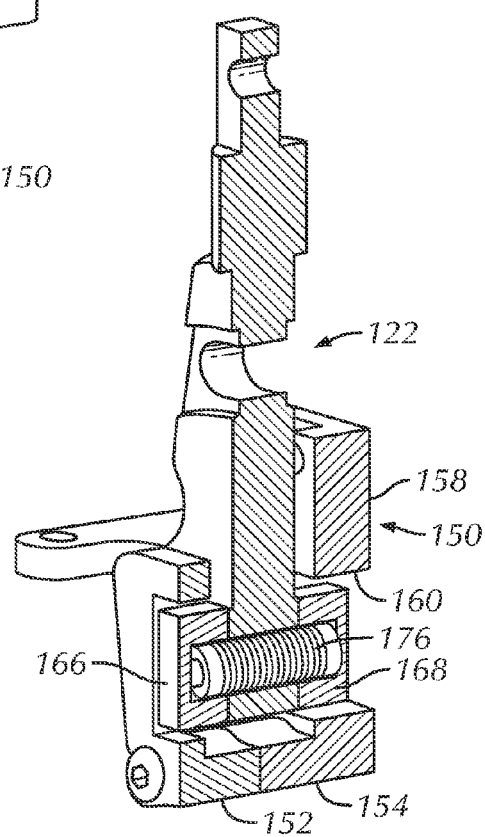
Figure 2C:
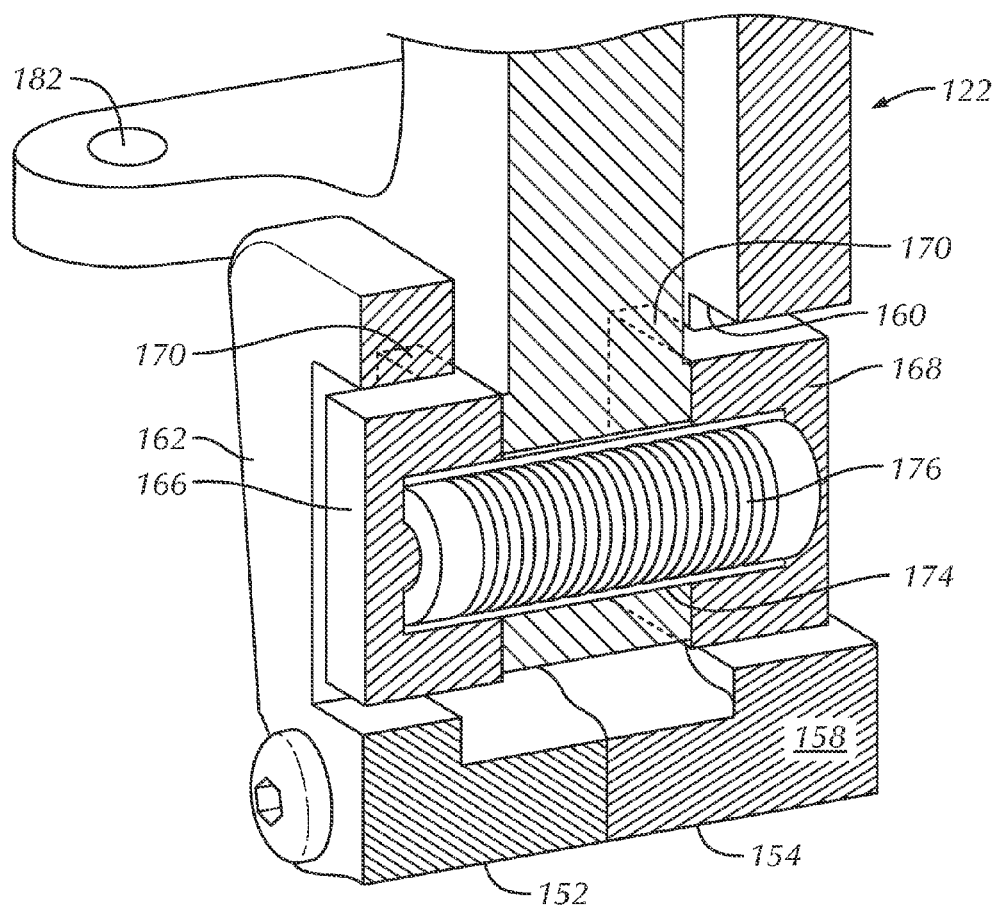
FIG. 2c shows part of FIG. 2b to an enlarged scale, with certain concealed detail being shown in phantom.
Figure 3A:
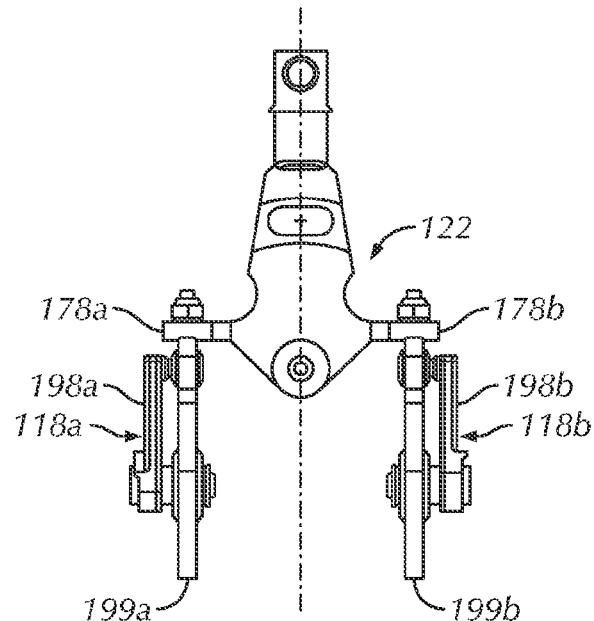
FIGS. 3a and 3b show a lever/roller assembly according to the invention from the front and from one side respectively.
Figure 3B:
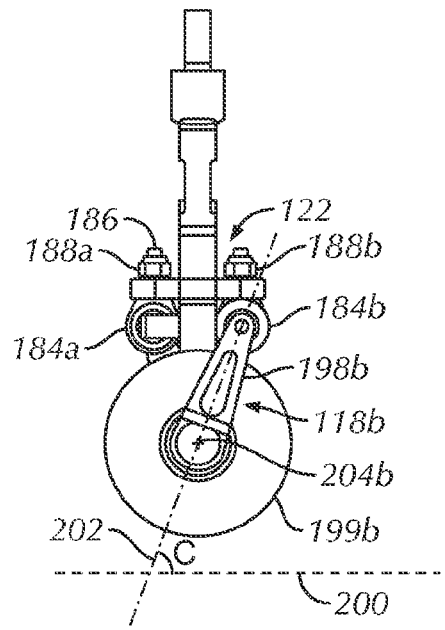
Figure 4:
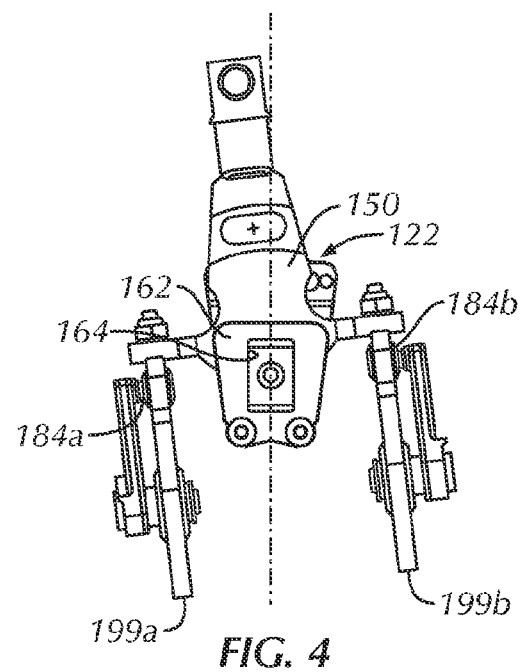
FIG. 4 shows the same lever/roller assembly from the front but also includes a bracket used to mount it.
Figure 5A:
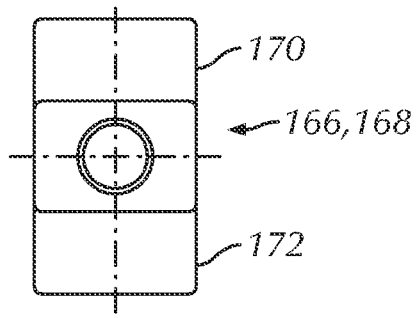
FIGS. 5a and 5b are plan and sectional views of a button which is part of the lever mechanism.
Figure 5B:
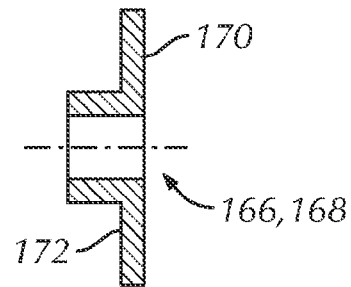

The lever 122 seen in FIGS. 2-4 is, like the lever 22 described with reference to the prior art, to be used to control roller movement in a variator. It is pivotally mounted in a bracket 150 which in turn is to be fixedly mounted to a casing (not shown) of the variator. The bracket comprises front and rear parts 152, 154 assembled to one another by means of machine screws 156. The rear part 152 has an integral back plate 158 with through-going holes for mounting of the bracket to the variator casing. Formed in the back plate 158 is a rear slot 160. The front part has a front plate 162 with a front slot 164 formed in it. The front and rear slots 160, 164 are in this particular embodiment of identical shapes and aligned one in front of the other. Front and rear buttons 166, 168 run in the respective slots and are rectangular in plan, their side faces forming a sliding fit in the slots and their length being shorter than that of the slots so that they are able to move along them. Wings or flanges 170, 172 (most clearly seen in FIG. 5) are integrally formed with the buttons and project laterally from them. The buttons are arranged on either side of the lever 122 and are coupled to it by a liner tube 174 (see FIG. 2c) which passes through a bore in the lever 122 and whose ends are received in respective blind bores in the buttons 166, 168. The liner tube 174 provides the pivotal mounting for the lever 122, which is thus able both to rotate through a limited angular range about the axis defined by the liner tube 174, and to be displaced a short distance along the direction defined by the slots 160, 164.

Assembly simply involves screwing the front and rear parts 152, 154 of the bracket 150 to one another around the lever 122 and buttons 166, 168, after which the lever and buttons are captive.

The mechanism incorporates, in accordance with the present invention, an arrangement for damping displacement (translation) of the lever assembly. To this end a spring 176 urges the front and rear buttons 166, 168 apart. In the present embodiment the spring is helical and is pre-stressed (compressed) during assembly. It passes through the liner tube 174 so that its ends abut respective buttons 166, 168. The wings 170, 172 of the rear button are thereby biased against the adjacent surface of the back plate 158, while the wings 170, 172 of the front button are biased against the front plate 162. Friction between the wings 170, 172 and the adjacent surfaces resists translation of the lever assembly and so provides the required damping. The effect of the damping is to dissipate the energy that might otherwise lead to unwanted oscillatory movement of the lever.

Note that only translation of the lever 122 is damped. Because the parts providing the frictional damping—the wings 170, 172—are coupled to the lever only through the bearing formed by the liner tube 174, rotational movement of the lever is not hindered.

Figure 6:
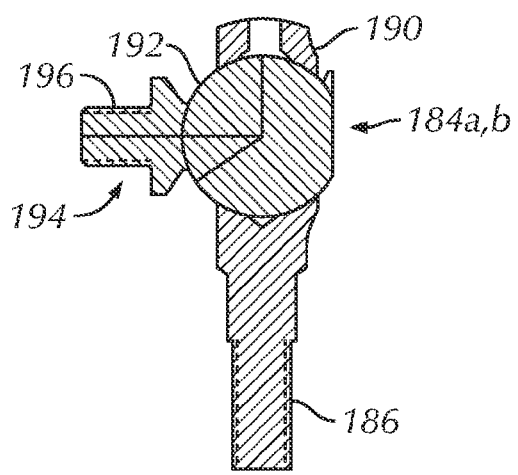
FIG. 6 is a section through a universal joint which is part of the lever mechanism.

The rollers and their carriers are omitted from FIGS. 2a-2c but can be seen in FIGS. 3a-3b and 4. In this embodiment the lever's cross bar is formed by laterally projecting flanges 178a,b having through-going bores 182 (FIG. 2c). Universal joints 184a,b couple a respective roller carrier 118a,b to each flange The construction of the universal joints 184 is best seen in FIG. 6. Each has a first part comprising a threaded shank 186 to be received in one of the bores 182 and secured to the flange 178 by means of a nut 188a, b (FIG. 3b). The shank 186 leads to a socket portion 190 whose part-spherical inner surface receives a spherical head 192 of a second part 194 of the joint. The first part may for example be swaged around the head 192 to retain it. A further threaded shank 196 projects from and is integrally formed with the head 192. The variator's carriers 118a,b are in the present embodiment each formed by a single limb 198a,b coupled to the corresponding universal joint through the threaded shank 196. The rollers 199a,b are mounted on the corresponding arms 198a,b through suitable rotary bearings.

It can be seen in FIG. 3b that the limbs 198a,b of the carriers are inclined. The variator's races are omitted from FIGS. 3a-3b, but their common axis (the variator axis) is indicated by a dashed line 200. A notional line 202 passing through the centre of the universal joint 184a and the centre of the roller 199b is seen to form a non-perpendicular angle C to the variator axis 200. The angle C is often referred to as the castor angle. Note that the rollers are free to tilt about the line 202 in use. As is well known in the art, this tilting of the rollers is controlled by their interaction with the races upon which they run, the rollers always tending to steer themselves so that their axes of rotation (indicated by a cross 204b in FIG. 3b) intersect the variator axis 200, and they can achieve this by virtue of the castor angle C. Turning the lever 122 causes both rollers 199a, b to move in the same direction—clockwise or anti-clockwise about the variator axis 200. This would result in the axes 204 of the rollers 199 moving out of intersection with the variator axis 200 were it not for the fact that the rollers automatically steer themselves, tilting about the lines 202, to restore this intersection. In so doing they move in unison to change the speed ratio provided by the variator. A relationship is thus established between lever position and roller tilt, or equivalently between lever position and variator ratio. By selecting a certain lever position, the variator ratio is correspondingly set.

As has been explained already, factors such as manufacturing tolerances would be expected to result in the rollers adopting fractionally different tilts and hence in unequal sharing of load between the rollers were it not for the fact that the assembly of the lever 122, carriages 118a,b and rollers 199a,b is able to move to enable the rollers to find positions in which load is shared equally. This movement (specifically, translation) of the lever is provided for by the manner of mounting of the lever 122—i.e. in this embodiment by the slots 160, 164 and buttons 166, 168 riding in them. The translation is in this embodiment along a direction which is radial with respect to the variator axis 200 of the variator races. Displacement of the assembly along this direction causes both the rollers to move in the opposite circumferential directions about the variator axis 200 (one clockwise, the other anti-clockwise) and consequently allows their tilt angles to alter to reduce inequality in load sharing.

There is in principle a risk that this displacement of the lever assembly will become oscillatory, with the assembly moving back and forth about its natural position and creating unwanted vibration. The problem is overcome in accordance with the present invention by virtue of the above explained damping of the lever displacement.

As noted above, the damping arrangement of FIGS. 2a-6 serves only to damp translation of the lever assembly and not its turning motion. In other embodiments it may be desirable to damp both motions of the lever assembly—rotation and translation. In this way unwanted oscillatory behaviour of lever rotation/roller inclination can additionally be resisted. A straightforward way to achieve such damping would be to dispense with the buttons 166, 168, liner 174 and spring 176, and instead to mount the lever 122 through a simple pin running in the slots 160, 164. Frictional damping could then be provided by springs pre-stressed between the lever 122 and the adjacent faces of the front and back plates 158, 162, to provide friction tending to resist both rotation and translation of the lever assembly. Springs in the form of conical washers (often referred to as "Belleville" washers) would be suitable.

Figure 1:
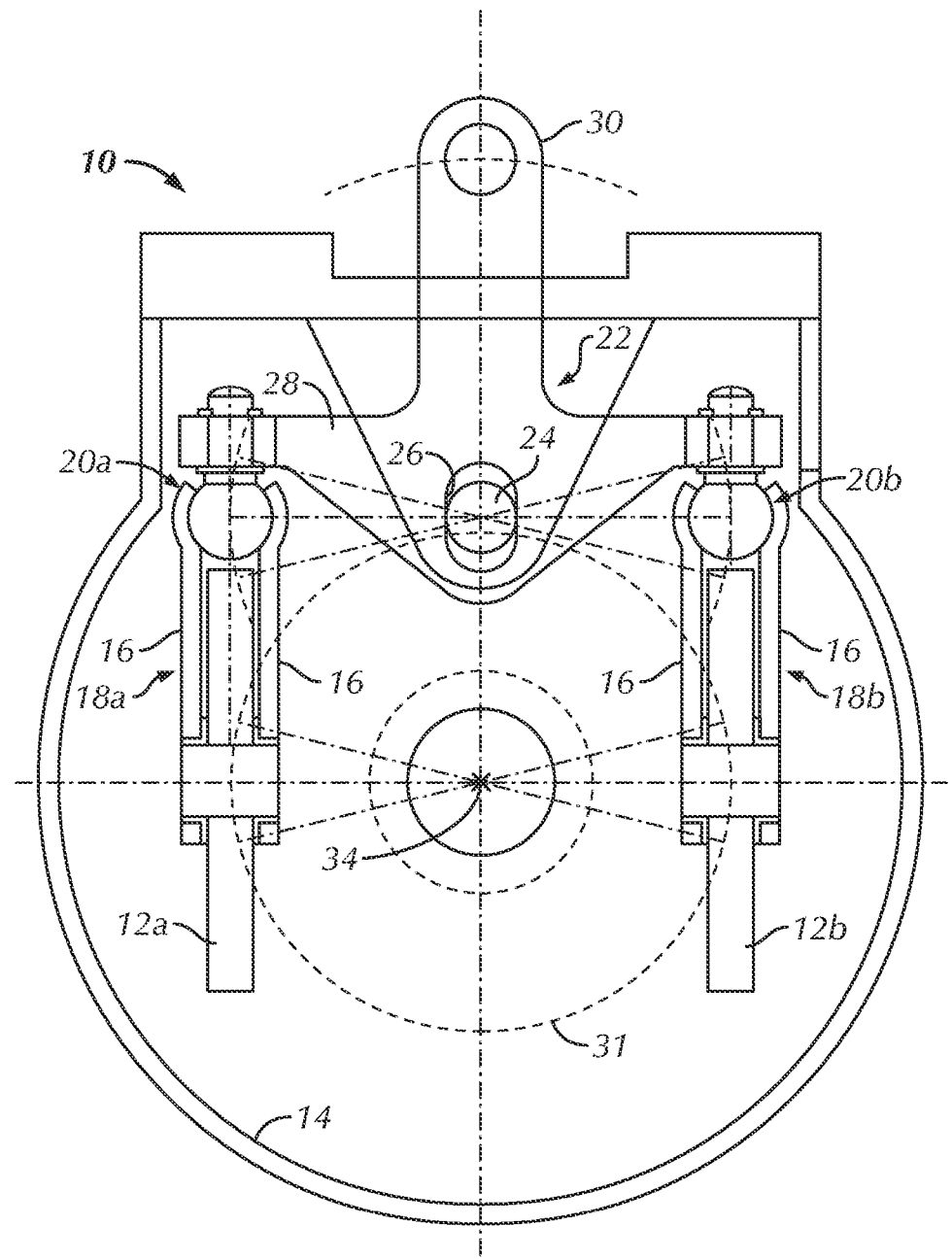
FIG. 1 is a somewhat simplified representation of a prior art variator, viewed along the axis of its races and with one of the races omitted to reveal interior components.

It must be understood that the aforegoing embodiments are presented by way of example rather than limitation. Numerous possible variants and design alternatives are possible without departing from the scope of the invention as set out in the claims. For example the dampers described herein are reliant upon friction, but it would be possible to substitute some other type of mechanism for this purpose, e.g. a hydraulic damper. Also in the type of arrangement depicted, in which a slot is used to permit translation of the lever, the slot may in principle be formed in the lever (as in the case of lever 22 in prior art variator 10 of FIG. 1) or in the lever's mounting (as in the embodiment of the invention in FIGS. 2a-6). The latter is preferred since the direction of travel of the lever 122 is always radial.

The invention claimed is:

1. A variator comprising first and second races mounted for rotation about a variator axis and having facing semi-toroidally recessed surfaces, first and second rollers disposed between the races to run upon their recessed surfaces and so transfer drive from one race to the other at a continuously variable speed ratio, each roller being rotatably mounted upon a respective carrier and being free to undergo a tilting motion to change a tilt angle between its axis and the variator axis, and a roller control part provided with mountings which permit it to undergo both (a) rotation about a fulcrum and (b) translation, the carriers being coupled to the control part on opposite sides of the fulcrum so that rotation of the control part causes the rollers both to move in the same circumferential direction about the variator axis and consequently to steer themselves in unison to new tilt angles thereby providing a change in the speed ratio, and translation of the control part permits the tilt angle of one roller to vary relative to that of the other and so enables the rollers to adopt positions in which load upon them is balanced, the variator being characterised by provision of a damper which damps translation of the control part.

2. A variator as claimed in claim 1 in which the damper damps only translation of the control part.

3. A variator as claimed in claim 1 in which the damper damps both translation and rotation of the control part.

4. A variator as claimed in claim 1 in which the damper is frictional.

5. A variator as claimed in claim 4 in which the damper incorporates a spring to bias together two surfaces, friction between which resists translation of the control part.

6. A variator as claimed in claim 1 in which the control part is a lever mounted through a fulcrum about which it is able to rotate.

7. A variator as claimed in claim 6 in which the fulcrum is movable to permit translation of the lever.

8. A variator as claimed in claim 7 in which the damper acts upon the fulcrum to damp translation of it.

9. A variator as claimed in claim 1 in which the damper acts between a fixed part and the control part itself, in order to damp both rotation and translation thereof.

10. A variator as claimed in claim 1 in which the control part's mountings permit it only one degree of freedom of translational movement.

11. A variator as claimed in claim 10 in which the control part is able to move only along a direction substantially radial to the variator axis.

12. A variator as claimed in claim 1 in which the mountings of the control part comprise a slot defining the direction along which the control part is able to translate, and a follower riding in the slot.

* * * * *